(12) United States Patent
Ballagh et al.

(10) Patent No.: US 7,010,664 B1
(45) Date of Patent: Mar. 7, 2006

(54) CONFIGURABLE ADDRESS GENERATOR AND CIRCUIT USING SAME

(75) Inventors: Jonathan B. Ballagh, Longmont, CO (US); Eric R. Keller, Boulder, CO (US); Roger B. Milne, Boulder, CO (US)

(73) Assignee: Xilinx, Inc., San Jose, CA (US)

( * ) Notice: Subject to any disclaimer, the term of this patent is extended or adjusted under 35 U.S.C. 154(b) by 339 days.

(21) Appl. No.: 10/427,418

(22) Filed: Apr. 30, 2003

(51) Int. Cl.
*G06F 12/00* (2006.01)

(52) U.S. Cl. .................... 711/218; 711/100; 711/154; 711/200; 711/217

(58) Field of Classification Search ................ 711/100, 711/154, 200, 211, 217, 218, 219
See application file for complete search history.

(56) References Cited

U.S. PATENT DOCUMENTS

| | | | | |
|---|---|---|---|---|
| 4,984,151 A | * | 1/1991 | Dujari | 712/241 |
| 5,301,344 A | * | 4/1994 | Kolchinsky | 712/32 |
| 5,784,636 A | * | 7/1998 | Rupp | 712/37 |
| 6,601,158 B1 | * | 7/2003 | Abbott et al. | 711/220 |
| 6,870,787 B1 | * | 3/2005 | Rohleder et al. | 365/230.01 |

\* cited by examiner

*Primary Examiner*—Tuan V. Thai
(74) *Attorney, Agent, or Firm*—Peter Hernandez; John King

(57) ABSTRACT

A configurable address generator includes addressing sequence circuitry such as a set of counters. A set of comparators is also preferably included in the configurable address generator in order to detect different addressing conditions (e.g., full, empty, etc.). Coupled to these components is a plurality of programmable bits that allows the address generator to be configured to meet a number of different design requirements. For example, the configurable address generator can be configured as a stack pointer; it can also be configured to provide address generation for FIFO and MAC-based filter circuits, etc.

22 Claims, 2 Drawing Sheets

CONFIGURABLE ADDRESS GENERATOR AND CIRCUIT USING SAME

FIELD OF THE INVENTION

This invention relates in general to the field of electronics and more specifically, to a configurable address generation circuit and to circuits using the configurable address generation circuit.

BACKGROUND OF THE INVENTION

Electronic devices such as Field Programmable Gate Arrays (FPGAs) typically require some form of address generation, especially in high bandwidth applications such as Digital Signal Processing (DSP), communications, or networking. This is typically done using Configurable/Complex Logic Block (CLB) resources in the FPGA to implement sequence generators, comparators and other associated logic required to produce the necessary control signals. For memory intensive operations, the addresses and accompanying control signals are often routed through the FPGA fabric.

The general trend in the FPGA field is to either absorb functionality that is external to the FPGA into the FPGA itself, or use hard (non-programmable) logic for commonly used circuits as for example when using dedicated multipliers in a FPGA design.

Address generator circuits are generally realized in hardware using counters or Linear Feedback Shift Registers (LFSRs) to produce the necessary addressing sequence. Comparators are then coupled with the sequence generators and are used to detect various conditions such as full, almost full, empty, etc. This combination of components can fulfill the addressing requirements for a variety of vector operations, including First-In First-Out (FIFOs), stacks, line buffering and Multiply-and-Accumulate Finite Impulse Response (MAC FIR) filtering.

Address generator circuits implemented in hard logic alone however cannot be reused for more than one of the above applications, since once implemented; the circuit cannot be modified. If an address generator is designed in hard logic (hard wired) to support the addressing needs of a FIFO for example, it cannot provide the addressing needs for a MAC FIR filter in most instances. A need thus exists in the art for an address generator that can alleviate some of the above-mentioned problems.

SUMMARY OF THE INVENTION

In accordance with one aspect of the present invention, a configurable address generation circuit includes an addressing sequence circuit and programmable logic coupled to the addressing sequence circuit. The programmable logic allows for the reconfiguration of the addressing sequence circuit to meet different address generation requirements. The programmable logic can be programmed such that the addressing sequence circuit can provide addressing to a variety of circuits such as stack pointers, line buffers, etc. In another aspect of the invention, the addressing sequence circuit includes at least one hardwired circuit, such as a counter.

In still another aspect of the invention, the configurable address generation circuit is located within an integrated circuit such as a Field Programmable Gate Array (FPGA). The configurable address generation circuit can be coupled to a memory such as a Block Random Access Memory (BRAM) or located within the BRAM itself.

BRIEF DESCRIPTION OF THE DRAWINGS

The features of the present invention, which are believed to be novel, are set forth with particularity in the appended claims. The invention, may best be understood by reference to the following description, taken in conjunction with the accompanying drawings, in the several figures of which like reference numerals identify like elements, and in which:

DETAILED DESCRIPTION OF THE PREFERRED EMBODIMENT

Figure 1:
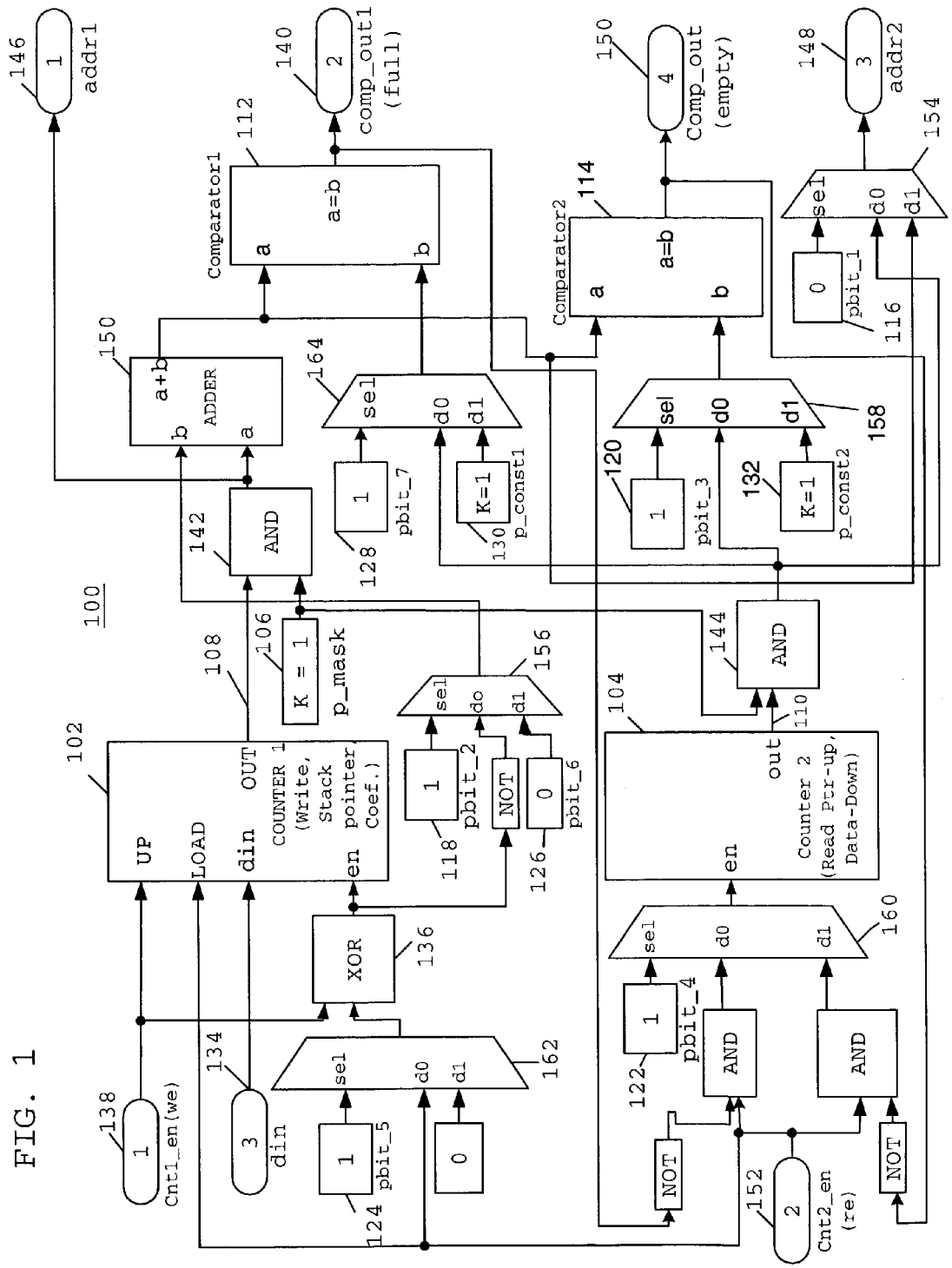
FIG. 1 shows a dedicated programmable address generation circuit in accordance with an embodiment of the invention.

While the specification concludes with claims defining the features of the invention that are regarded as novel, it is believed that the invention will be better understood from a consideration of the following description in conjunction with the drawing figures.

Instead of using a static hard-wired design for address generation as in the prior art, an exemplary embodiment of the present invention places a small amount of programmable logic around the sequence generator and comparator pairs used in the address generator so that the circuits are flexible and can be programmed to meet the requirements of a variety of applications.

Referring now to the drawings and in particular to FIG. 1, there is shown a programmable circuit for flexible address generation 100 in accordance with the preferred embodiment. It should be noted that the configurable address generation circuit 100 has been generalized for even powers of two in the circuit shown in FIG. 1, but is not so limited.

The configurable address generation circuit 100 includes in the preferred embodiment an addressing sequence circuit that in one embodiment comprises pair of counters 102 and 104 that are used to produce a binary address sequence. Although counters 102 and 104 are used in circuit 100, LFSRs can be used as an alternative, with some minor modification to the circuit 100.

Counter 102 comprises a reloadable counter with up/down and load capabilities. Counter 102 has control signal inputs "UP", "LOAD", and "en", and data signal input "din". When the UP signal is asserted (cntl_en=1) the counter 102 counts up. When the UP line is unasserted (cntl_en=0) the counter 102 counts down. When the LOAD signal is asserted the data in din 134 is loaded into and sets the initial value of the counter 102. The counter 102 is enabled for counting when en=1. "OUT" is an output signal having the count value of the counter 102.

Counter 104 is like counter 102, except in the preferred embodiment, the initial value of the count and whether counter 104 counts up or down are set by configuration bits (not shown) internal to the counter 104. Hence, the counter 104 does not need the "UP", "LOAD", or "din" input ports. In an alternative embodiment, counter 104 has the "UP", "LOAD", and "din" input ports, where each of these input ports is connected to one or more configuration memory cells, similar to counter 102.

While counter 104 can be configured to count either up or down, in the preferred embodiment, the direction is not switchable during operation. Both counters 102 and 104 can be initialized to a given value, as is required to establish a fixed address offset for line buffers.

A programmable mask, p_mask 106, can be configured to mask off counter output bits from counter outputs 108 and 110 using logic AND gates 142 and 144, allowing for different counter ranges within varying powers-of-two. Coupled to counters 102 and 104 are a pair of comparators 112 and 114. Each comparator 112 and 114 is used to detect different addressing conditions (e.g., full, empty, etc.).

There are also a series of programmable bits, pbits_X (X=1 to 7) 116 to 128, that control the internal circuit configurations. Circuit blocks p_Const1 130 and p_const2 132 are programmable constant values. Programmable bit, pbit_1 116 provides the selection signal for multiplexer (mux) 154, while pbit_2 118 provides the selection signal for mux 156122, pbit_3 120 provides the selection signal for mux 158, pbit_4 provides the selection signal for mux 160, pbit_5 124 provides the selection signal for mux 162 and pbit_7 128 provides the selection signal for mux 164.

The programmable bits 116–128, the programmable constants 130, 132 and the programmable mask 106 can receive their programming information from the configuration bit file that is loaded into the FPGA, or by using another control mechanism. In the specific case where the configurable address generation circuit 100 is located within an FPGA, the programming information for the programmable circuitry can come from the FPGA's routing matrix or other circuitry.

In order to better understand some of the addressing applications configurable address generation circuit 100 can be used for and how the circuit 100 is configured to implement different designs, a brief overview follows of different functions configurable address generation circuit 100 can be programmed to perform.

Stack Pointer

Figure 2:
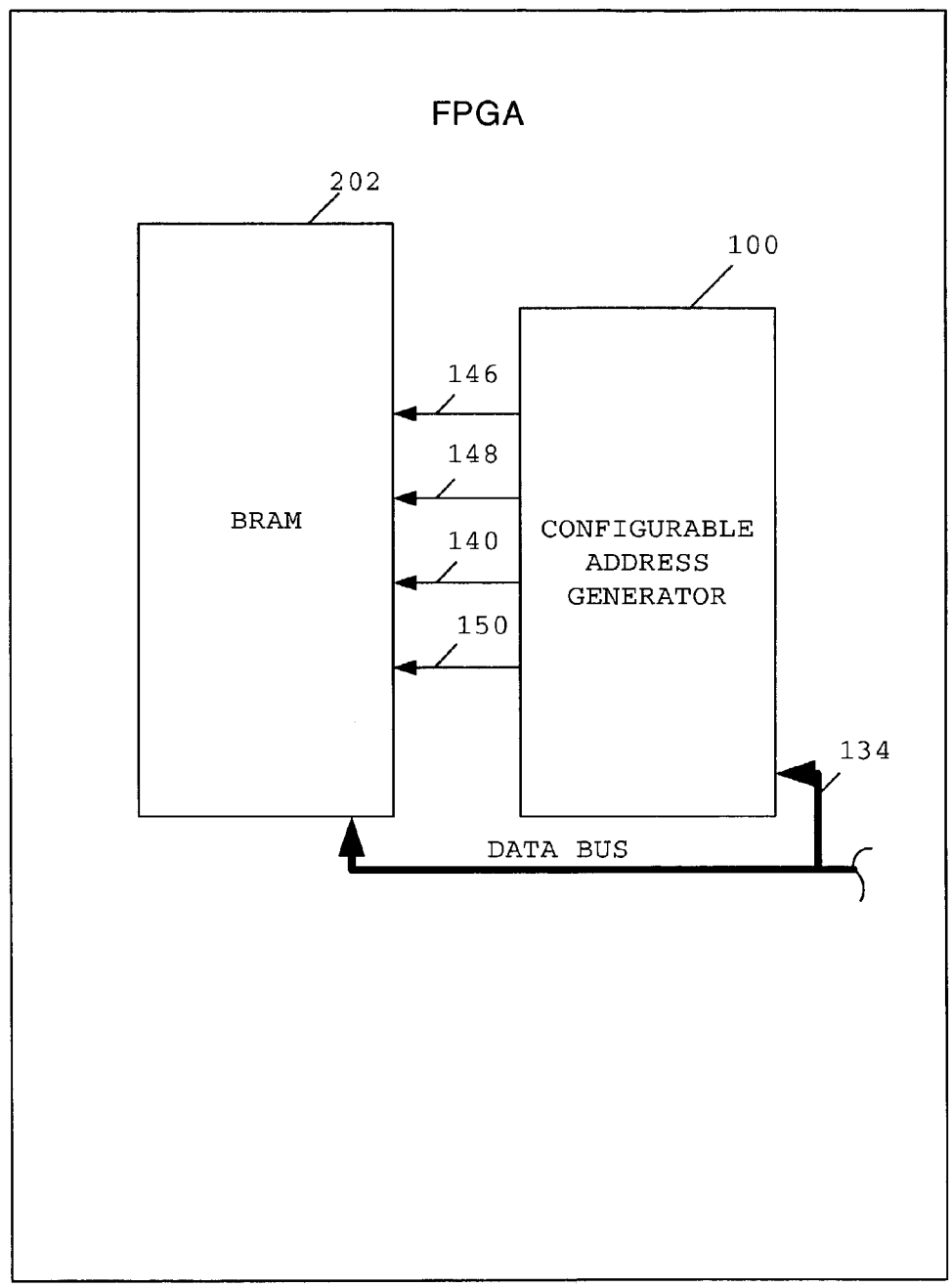
FIG. 2 shows a FPGA using the address generation circuit of FIG. 1 in accordance with an embodiment of the invention.

The ability for counter 102 to be able to count up/down and to be reloaded makes it suitable for use in implementing a stack pointer. The data load line (din) 134, can be shared by the Block Random Access Memory (BRAM)'s data line (not shown) so extra routing resources do not need to be expended. An integrated circuit such as a FPGA 200 that includes a block memory 202 coupled to the configurable address generation circuit 100 is shown in FIG. 2.

In using circuit 100 to implement a stack pointer, the second counter 104 is not used. The write address should always be one larger than the read pointer, except when simultaneous read/writes are requested. By setting programmable bit, pbit_5 124 to zero, it ensures that first counter 102 is not enabled when there are simultaneous read and write requests via the Exclusive-OR logic gate 136. The first counter's 102 counter enable (cnt1_en) port 138 receives a signal that drives the up/down input of counter 102. The second counter enable port 152 (Cnt2_en) receives the signal that drives the input of the second counter 104 and is also used to drive the enable port of the first counter 102 through an Exclusive-OR (XOR) logic gate 136. The first counter 102 can also be configured to be in an inactive state.

Setting programmable bit, pbit_2 118 to a logic zero, ensures that the read and write addresses will have the same value during simultaneous read/write requests. Otherwise, a logic one value will be added to the counter's output 108 to produce the write address.

FIFO

Circuit 100 can also be configured to provide address generation for FIFO's using BRAM. In this configuration, counter 102 produces the write address at address output (addr1) 146, and counter 104 produces the read address at address output (addr2) 148. Comp_out1 output port 140 provides the "full" signal, which is detected when the write address is one less than the read address. This is realized in the circuit by using a dedicated adder 150 to add one to the current write address, and then comparing that value against the current read address. To add one to the write address, pbit_6 126 and pbit_2 118 must be set to one.

The empty signal (comp_out) 150 is asserted by the second comparator 114 when the read and write addresses are the same. By setting pbit_4 122 to one, the second counter 114 will stall if a read is attempted and the FIFO is currently empty. Though not shown, additional logic can be included to produce percent full and almost full/empty signals.

Mac Fir Filter Addressing

Mac filter addressing can be realized using circuit 100 by using the first counter 102 to address the coefficients of the filter and the second counter 104 to address the data sample addresses. In this example, the second counter 104 is configured to count down. Setting pbit_4 122 to zero will select the inverted first comparator output 140. This will result in a one-cycle stall in the data counter when the coefficient address matches the programmed constant in p_const1 130. This is to ensure that the data and the coefficients are correctly aligned. The first counter 102 should be configured as a cyclical counter, from 0-to-N, where "N" is equal to the number of filter taps. This is realized by setting p_bit_5 124 equal to one, pbit_2 118 equal to one, and pbit_6 126 equal to zero.

Line Buffers

Addressing for line buffers is realized by initalizing the first counter 102 with a value that sets up a fixed offset from the second counter 104 and also determines the buffer size. In this particular example, p_bit5 124 is set to one, pbit_2 is set to one, and pbit_6 126 is set to zero.

As been shown by some of the illustrative examples discussed above, circuit 100 given its programmable nature can be used to implement a variety of address generation functions. Furthermore, by adding additional logic, a set of cascaded address generators can be implemented, which would be particularly useful in implementing line buffers that span multiple block RAMs. The circuit 100 can be further optimized for silicon implementation. LFSRs can offer a smaller alternative to the counters shown in circuit 100. Finally, although the attached circuit is applicable to operations in which the vector size is an even power of two, the circuit can be extended in order to support arbitrary vector sizes as those used in MAC FIR filters.

By coupling programmable and fast address generation components (in the form of hard-wired circuitry) together to a memory such as block memory 202, the addressing needs of several different types of uses (e.g., FIFOs, stacks, etc.) can be meet with the single programmable address generation circuit 100. Although the configurable address generator 100 can for example reside inside or outside of a block memory such as block RAM 202, it is useful near any memory storage element found in the FPGA 200 or other integrated circuit in order to avoid routing delays.

By combining hardwired and programmable circuits together, the configurable address generator 100 can provide for improved flexibility, especially when implemented in programmable circuits such as FPGAs. The hardwired circuits provide for area and speed improvements, while the programmable circuits allows for the configurable address generator 100 to be suitable for a large number of applications.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. A configurable address generation circuit, comprising:
an addressing sequence circuit comprising a plurality of counting circuits and at least one comparator coupled to the plurality of counting circuits; and
programmable logic coupled to the addressing sequence circuit, the programmable logic configuring the addressing sequence circuit in response to programmable bits of a configuration bit file coupled to the configurable address generation circuit to meet one of a plurality of address generation requirements, the programmable logic being programmed so that the configurable address generation circuit provides address generation wherein a first counting circuit of the plurality of counting circuits provides write addresses and a second counting circuit of the plurality of counting circuits provides read addresses.

2. A configurable address generation circuit as defined in claim 1, wherein the plurality of counting circuits comprises at least one counter.

3. A configurable address generation circuit as defined in claim 1, wherein the plurality of counting circuits comprises at least one linear feedback shift register.

4. A configurable address generation circuit as defined in claim 1, wherein the at least one comparator is used to detect different addressing conditions.

5. A configurable address generation circuit as defined in claim 1, wherein the programmable logic can be programmed so that the address generation circuit functions as a stack pointer.

6. A configurable address generation circuit as defined in claim 5, wherein a counting circuit of the plurality of counting circuits comprises a counter which can count up and/or down and is reloadable.

7. A configurable address generation circuit as defined in claim 1, wherein the addressing sequence circuit includes first and second counters and the programmable logic is programmed such that the first and second counters can address a MAC FIR filter.

8. A configurable address generation circuit as defined in claim 7, wherein the first counter addresses coefficients of the FIR filter and the second counter addresses data sample addresses of the MAC FIR filter.

9. A configurable address generation circuit as defined in claim 1, further comprising a comparator coupled to first and second counters, the comparator comparing the write addresses from the first counter and the read addresses from the second counter and providing a full signal when the write address is one less than the read address.

10. A configurable address generation circuit as defined in claim 9, wherein the programmable logic is programmed such that the first and second counters address a First-In First-Out circuit.

11. A configurable address generation circuit as defined in claim 1, wherein the addressing sequence circuit is coupled to a Block Random Access Memory (BRAM) located within a Field Programmable Gate Array (FPGA).

12. An integrated circuit, comprising:
an addressing sequence circuit comprising a plurality of counting circuits and a comparator coupled to the plurality of counting circuits;
programmable logic coupled to the addressing sequence circuit, the programmable logic used to configure the addressing sequence circuit in response to programmable bits of a configuration bit file coupled to the integrated circuit, the programmable logic being programmed so that the integrated circuit provides address generation wherein a first counting circuit of the plurality of counting circuits provides write addresses and a second counting circuit of the plurality of counting circuits provides read addresses; and
a memory coupled to the addressing sequence circuit.

13. An integrated circuit as defined in claim 12, wherein the memory comprises a Block Random Access Memory.

14. An integrated circuit as defined in claim 13, wherein the integrated circuit comprises a Field Programmable Gate Array (FPGA).

15. An integrated circuit as defined in claim 14, wherein the addressing sequence circuit comprises hard-wired circuits.

16. An integrated circuit as defined in claim 12, wherein the addressing sequence circuit comprises hard-wired circuits and the programmable circuitry configures the hard-wired circuits to meet different address generation requirements.

17. An integrated circuit as defined in claim 16, wherein the integrated circuit comprises a Field Programmable Gate Array (FPGA).

18. A Field Programmable Gate Array (FPGA), comprising:
an addressing sequence circuit comprising a plurality of counting circuits and a comparator coupled to the plurality of counting circuits; and
programmable logic coupled to the addressing sequence circuit, the programmable logic configuring the addressing sequence circuit in response to proarammable bits of a configuration bit file coupled to the FPGA in order to provide addressing to different types of circuits, the proarammable logic being programmed so that the FPGA provides address generation wherein a first counting circuit of the plurality of counting circuits provides write addresses and a second counting circuit of the plurality of counting circuits provides read addresses.

19. A FPGA as defined in claim 18, further comprising:
a memory coupled to the addressing sequence circuit.

20. A FPGA as defined in claim 19, wherein the addressing sequence circuit comprises hard-wired circuitry.

21. A FPGA as defined in claim 20, wherein the programmable logic allows for the addressing sequence circuit to be configured to address different types of circuits.

22. An integrated circuit, comprising:
an addressing sequence circuit, comprising a means for counting and a means for comparing; and
a means for configuring the addressing sequence circuit in response to programmable bits of a configuration bit file coupled to the integrated circuit in order to provide addressing to different types of circuits, the means for configuring being programmed so that the integrated circuit provides address generation wherein a first counting circuit of the means for counting provides write addresses and a second counting circuit of the means for counting circuits provides read addresses.

* * * * *